March 5, 1957

T. M. BERRY 2,783,540

ROLLING CONTACT MEASURING APPARATUS UTILIZING A MAGNETIC COUNTING DEVICE

Filed Sept. 30, 1953

INVENTOR:
THEODORE M. BERRY, deceased
BY; ALBERT L. BERRY
ADMINISTRATOR by Merton D. Morse
Attorney.

March 5, 1957 T. M. BERRY 2,783,540
ROLLING CONTACT MEASURING APPARATUS UTILIZING
A MAGNETIC COUNTING DEVICE
Filed Sept. 30, 1953 2 Sheets-Sheet 2
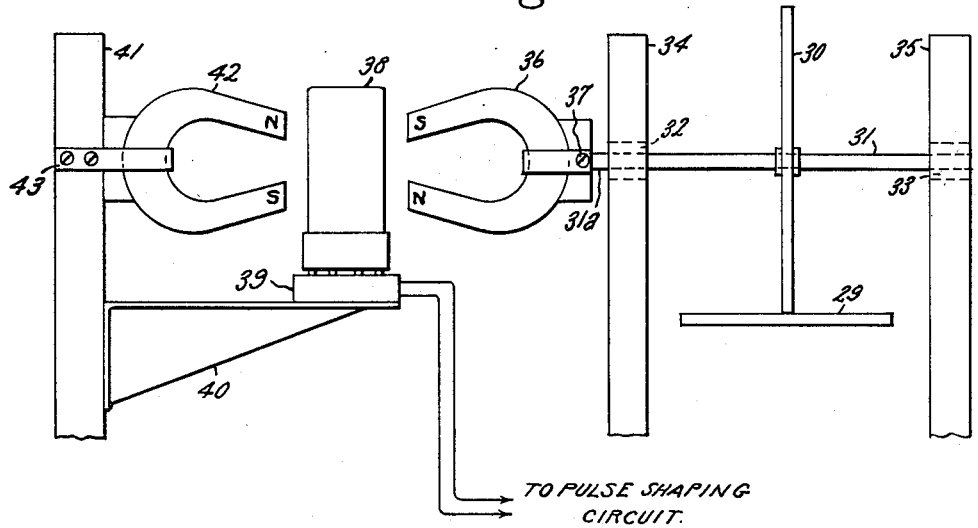
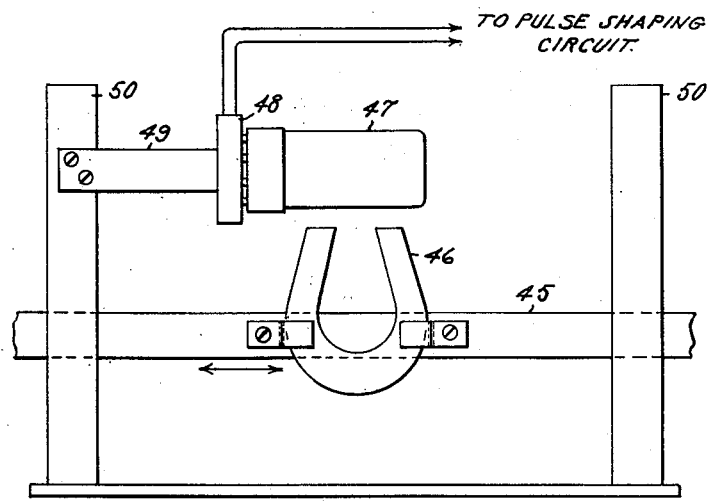
INVENTOR:
THEODORE M. BERRY, deceased
BY; ALBERT L. BERRY
ADMINISTRATOR
by Merton D Moore
Attorney.

United States Patent Office 2,783,540
Patented Mar. 5, 1957

2,783,540

ROLLING CONTACT MEASURING APPARATUS UTILIZING A MAGNETIC COUNTING DEVICE

Theodore M. Berry, deceased, late of Schenectady, N. Y., by Albert L. Berry, administrator, Jewell, Kans., assignor to General Electric Company, a corporation of New York Application September 30, 1953, Serial No. 383,212

10 Claims. (Cl. 33—134)

This invention pertains to counting devices, and in particular to counting devices of the type providing an electrical output signal in response to movement of an element whose motions are to be counted.

In measuring the length of a continuous wire or strip of steel, textile, paper or other material, it is common practice to employ a rotatable wheel which has its rim in contact with the material. As the material moves past the wheel, it rotates the wheel on its axis, and the number of revolutions of the wheel may then be used as a measure of the length of the material which has passed by it. Occasionally, the rotating wheel directly drives a counter, but more often it is required remotely to indicate the number of revolutions made. In this case, a commutator, cam, or photoelectric system, may be attached to the rotating wheel in order to furnish impulses for a suitable counter.

Counting devices of this type are subject to wear and misoperation due to dirt and foreign matter being deposited in the commutator, and, in addition, the commutator adds friction to the measuring device and may cause slippage between the rotating wheel and the moving material being measured. Such devices may also be operationally limited in the speed at which they will operate. Thus, if the rotating wheel is reduced in diameter in order to have a more accurate measurement, thereby increasing the speed of rotation of the wheel, it may become necessary to decrease the speed with which the material moves past the wheel, in order to comply with the speed limitation inherent in the device.

Therefore, it is an object of the present invention to provide a counting device which may be adapted to count revolutions or movements of an element, and which is frictionless, is operable at any reasonable speed, and is sealed against dirt and other contamination.

One form of the present invention wherein the foregoing objects are attained comprises an electronic discharge device, of the type wherein the flow of current may be varied by applying a magnetic field to the device, and a permanent magnet, which is secured to the element whose motions are to be counted. The magnet and electronic discharge device are so positioned relative to each other that, as the magnet moves, its magnetic field passes through the discharge device at least once during every cycle of motion. Means are provided to count the variations in the flow of current through the electronic discharge device, which have been caused by the action of the magnetic field in passing through the device.

Other objects and advantages of the invention will become apparent from the following description taken in conjunction with the accompanying drawing, in which Fig. 1 is a diagrammatic view of one embodiment of the invention;

Fig. 3 is a diagrammatic view of a modified form of the device; and

Fig. 4 is a diagrammatic view of another form of the invention.

Figure 1:
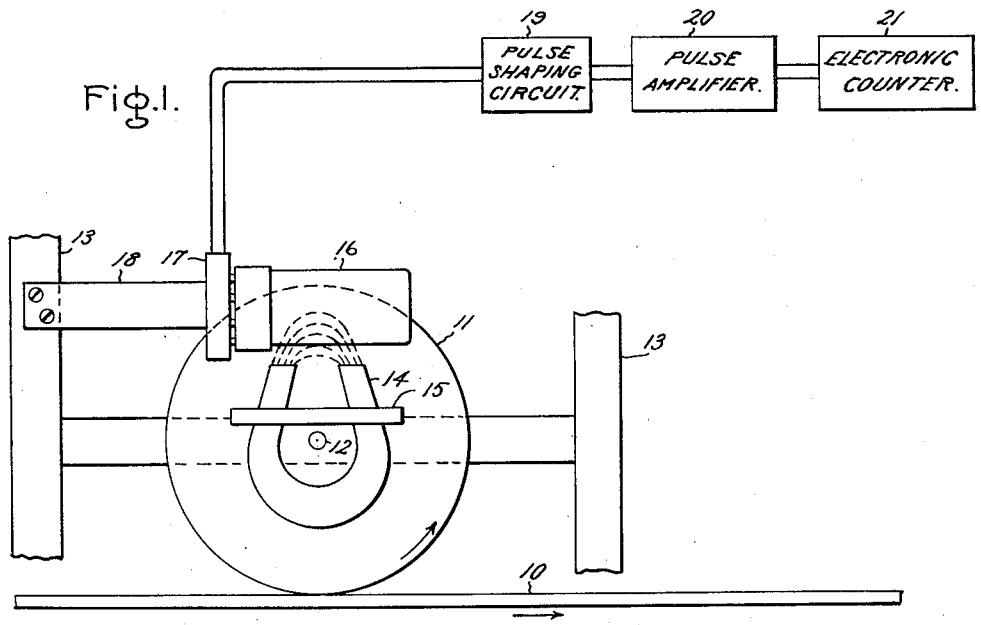

Several forms of the invention are illustrated and will be described, for purposes of explanation, in conjunction with a device for measuring the length of a material, such as steel, textile, paper or other material, which has the form of a relatively long continuous strip or wire. Referring to the device shown in Fig. 1, a strip of material 10, whose length is to be measured, moves past the length measuring device, which is stationary, and a wheel 11, whose rim is in frictional contact with the strip, is rotated about its axis by the movement of the material. The wheel is mounted in suitable bearings (not shown) on a shaft 12 supported in the frame 13 of the length measuring device, and a magnet 14, which in this instance is of the permanent horseshoe variety, is fixed to the wheel 11 by any convenient means, such as by a strap 15.

Mounted in proximity to the revolving wheel 11, in a position to be later described in detail, is an electronic discharge device 16, of the type known in the art as a magnetron tube (magnetically controlled diode). Conventional devices of this type generally consist of a filamentary or heater type electron-emitting cathode centrally disposed in a glass envelope and surrounded by a concentric cylindrical anode. In certain types, the anode is divided into a plurality of segments, but the mode of operation, as applied to the present invention, is the same whether the anode is a unitary cylinder or divided into segments. When the proper voltages are applied to the anode and cathode of a magnetron, electrons travel radially from the cathode to the anode. However, when the magnetron is placed in a magnetic field, with the magnetic lines of force lying substantially parallel to the axis of the cathode and anode, the trajectories of the electrons are bent by the action of the magnetic field. As the strength of the magnetic field is increased, the trajectories of the electrons are increasingly bent, and the electrons tend to spiral around the cathode, with their radial component of velocity being much smaller than the angular component. If the strength of the magnetic field becomes great enough, a cloud of electrons rotates about the filament and extends up toward the anode, but few electrons actually reach it. Thus, there is almost no current flow from anode to cathode under this condition.

In the form of the invention illustrated in Fig. 1, a magnetron 16 with its associated socket 17 is mounted in a convenient manner such, for example, as on one end of a support 18, the other end of which is secured to a portion of the frame 13 of the length measuring device. The magnetron 16 is so positioned with respect to the rotating magnet 14 that, as the magnet rotates, its magnetic field passes through the magnetron, with the lines of force substantially parallel to the axis of the cathode and anode of the magnetron.

Voltages of the proper well-known values are supplied to the anode and filamentary cathode or heater of the magnetron from a pulse shaping circuit 19, later to be described, in order to heat the filament and cause electrons to flow from the cathode to the anode.

Each time that the wheel 11 and magnet 14 revolve, the lines of force of the magnetic field intersect the magnetron 16. When this occurs, the normal flow of current from anode to cathode of the magnetron is decreased or interrupted, and the potential on the anode of the magnetron rises toward the value determined by the supply voltage. As the magnet rotates beyond the magnetron and the magnetic field no longer intersects the magnetron, the current through the magnetron again rises to its normal value and the anode potential decreases. Thus, a voltage pulse appears on the anode of the magnetron each time the magnet revolves past the magnetron.

Figure 2:
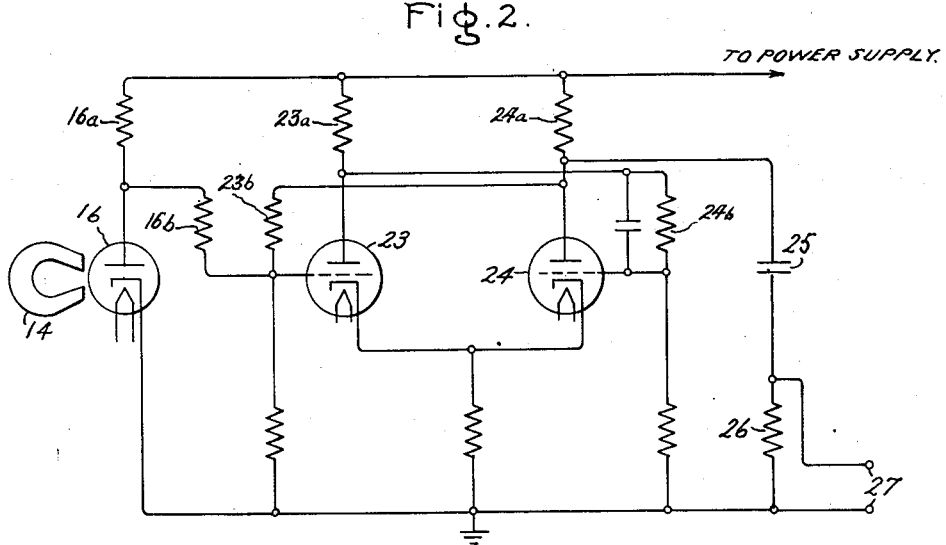
Fig. 2 is a diagram of a pulse shaping circuit suitable for use in the invention.

One of the advantages of the invention is that the amplitudes of the current pulses and anode voltage pulses are independent of the speed of revolution of the wheel and magnet for any reasonable speed, because the same amount of magnetic flux intersects the magnetron during each revolution of the magnet, regardless of the speed. However, the width of the pulses (time duration) and the slope of their leading and trailing edges are affected by the speed of rotation of the magnet. Therefore, it is desirable to shape the pulses in some manner such as by employing them as triggers to actuate a circuit 19 which will provide output pulses of uniform shape. A circuit which is suitable for this purpose is shown in Fig. 2 and is a modification of the well-known Eccles-Jordan trigger or shaping circuit.

This circuit has two stable conditions of operation in which one tube is conducting and the other non-conducting, and the potential on the anode of the magnetron 16 determines which of the tubes is conducting, in accordance with well-known principles. For example, when the magnetic flux from the permanent magnet 14 is not passing through the magnetron in the proper direction to reduce the current flowing from the anode to the cathode, the potential on the anode is low, because the anode-to-cathode resistance of the magnetron is low. Thus, the majority of the voltage drop in the magnetron circuit occurs across resistor 16a connected between the magnetron anode and a power supply (not shown), which also provides voltage to heat the filaments of the magnetron and the triodes 23 and 24. Since the magnetron anode is connected to the control grid of the vacuum tube 23 through resistor 16b, this tube will be cut off and its anode potential will be at or near the value of the voltage supplied from the power supply, to which it is connected through resistor 23a. The anode of tube 23 is also connected to the control grid of tube 24 through resistor 24b, which causes the control grid of tube 24 to be at a high potential and tube 24 to be heavily conducting, with the majority of the voltage drop in its circuit occurring across its anode resistor 24a. The potential on the anode of tube 24 is low, and, because the anode of tube 24 is connected to the control grid of tube 23 through resistor 23b, the potential on the control grid of tube 23 is low. Thus, this action reinforces that of the magnetron to cause tube 23 to be cut off while tube 24 is heavily conducting.

However, as the magnetic field of the magnet 14 passes through the magnetron and reduces the current flowing therethrough, the magnetron anode and the control grid of tube 23 rise in potential, because the majority of the voltage drop in the magnetron circuit occurs across the magnetron itself. When the voltage at the control grid of tube 23 rises above cut-off value, the tube 23 starts to conduct. Its anode potential drops, because the voltage drop across its anode resistor 23a is large and the voltage drop across the tube is small, which, in turn, lowers the potential of the control grid of tube 24, because the anode of tube 23 is connected to the control grid of tube 24 through resistor 24b. This causes the anode voltage of tube 24 to rise and, because the anode of tube 24 is connected to the control grid of tube 23 through resistor 23b, the potential on the grid of tube 23 is raised still further, which causes tube 23 to conduct more heavily and the potential on the anode of tube 23 and on the control grid of tube 24 to be reduced further. Thus, tube 24 is quickly cut off while tube 23 conducts heavily, and the tubes remain in this condition until the potential on the magnetron anode decreases. Of course, the reverse action takes place when the magnetic field passes out of the magnetron and the magnetron current again rises.

The output of this circuit is substantially a square wave, and may be taken conveniently from the anode of tube 24. Because the width of the square wave is determined by the width of the voltage pulse on the magnetron anode, it is desirable to differentiate it, and this may be done by a conventional circuit comprising a capacitor 25 and a resistor 26, connected in series between the anode of tube 24 and ground. The output of the differentiating circuit is taken across the resistor 26, and sharp positive and negative pulses of constant width will appear at output terminals 27 in response to rises and falls of potential of the anode of tube 24. These output pulses may be amplified by a suitable amplifier 20, before being used to trigger an electronic counter 21, which may be of the type to count either positive or negative pulses as desired. The pulse amplifier 20 and the electronic counter 21 are circuits of conventional design such as are well-known in the art, and may be designed to operate at speeds up to several hundred kilocycles per second.

An operator, knowing the size of the revolving wheel 11 and obtaining from the counter 21 the number of revolutions made by the wheel, may easily compute the length of material which revolved the wheel. When more convenient for the particular application involved, he may read the length from a chart previously prepared for a wheel of that size, or the wheel size and counter scale may be chosen to read directly in the desired units of length.

Many variations and modifications may be made in the form of the invention shown in Fig. 1. For example, the accuracy of the length measurement may be improved by counting fractions of a revolution of the wheel and magnet, which requires that there be a plurality of output pulses from the magnetron for every revolution of the magnet. A possible arrangement for obtaining these pulses is to mount a plurality of magnets on the rotating wheel and angularly space the magnets about the axis of the wheel. Then, as the wheel rotates, the fields of the magnets may successively pass through the magnetron and the passing of each magnetic field results in an output pulse from the magnetron. The magnets may be mounted on the wheel with the planes of the magnets in any convenient angular relationship with respect to the plane of the wheel, so long as the magnetic fields intersect the magnetron at a suitable angle as the wheel rotates. It is apparent that a similar result may be obtained by employing a plurality of magnetrons, angularly spaced about the axis of the rotating wheel, and one or more magnets secured to the wheel.

Another form of the invention, which may be adapted to provide either one or two output pulses for each rotation of a wheel, is shown in Fig. 3. As in the embodiment previously described, a material 29, whose length is to be measured, rotates a wheel 30 as the material moves past the length measuring device. The wheel 30 is secured to a shaft 31, which is mounted for rotation in suitable bearings 32 and 33 in supporting portions 34 and 35 of the frame of the device, with an end 31a of the shaft extending beyond the bearing 34.

A permanent horseshoe magnet 36 is secured to the end 31a of the shaft by conventional means, such as a screw 37, and a magnetron 38 with its socket 39 is mounted adjacent the magnet 36 on a bracket 40 attached to a portion 41 of the frame of the device. The magnetron is so positioned that the magnetic field of the permanent magnet passes through the magnetron, and twice during each revolution of the shaft 31 the lines of force of the magnetic field will be substantially parallel to the axis of the cathode and anode of the magnetron. Voltages of the proper values may be supplied to the anode and filamentary cathode or heater of the magnetron from a pulse shaping circuit (not shown) similar to the circuit previously described, in order to establish current flow between the anode and cathode.

The current which would normally flow from the anode to the cathode of the magnetron 38 is also affected by a second permanent horseshoe magnet 42 mounted adjacent the magnetron on a support 43 removably attached to the portion 41 of the frame of the device, and aligned with the rotatable magnet 36. The second magnet 42 is mounted in a fixed position with the lines of force of its magnetic field passing through the magnetron in a direction substantially parallel to the axis of the magnetron anode and cathode, and thus it tends greatly to reduce or stop the flow of current through the magnetron.

In the operation of the form of the invention shown in Fig. 3, the voltage pulses which appear on the anode of the magnetron as the wheel 30 revolves are negative rather than positive, as was the case with the embodiment shown in Fig. 1. This effect is due to the combined action of the two permanent magnets 36 and 42. As was mentioned above, the fixed magnet 42 tends to reduce or stop the flow of current from anode to cathode of the magnetron, and, therefore, the potential at the magnetron anode tends to remain at or near the value of the supply voltage. However, once during each revolution of the wheel 30 and magnet 36, the two magnets will be positioned as shown, with the north pole of one opposite the south pole of the other, and, when this occurs, the magnetic fields of the two magnets are opposed and tend to cancel each other. Thus, at this time, current flows from anode to cathode in the magnetron, and the potential on the anode drops. As the magnet 36 rotates away from this aligned position, the current through the magnetron decreases, and the anode voltage rises. As the magnet continues to rotate and its field is no longer parallel to the axis of anode and cathode of the magnetron, the magnetron current decreases again, and its anode voltage rises toward the value of the supply voltage. When the magnet 36 has rotated 180° from the position shown, its magnetic field reinforces that of the fixed magnet 42. However, if the fixed magnet is strong enough by itself to stop the flow of magnetron current, the reinforcing action of the rotating magnet will cause no change in the voltage appearing at the magnetron anode. Thus, it is apparent that there will be one output pulse during each revolution of the wheel 30, and that this pulse will appear as a temporary decrease in the potential of the magnetron anode.

If it is desired to have two output pulses for each revolution of the wheel 30, the magnet 42 may be quickly removed from the device. In this case, the lines of force of the magnetic field of the rotatable magnet 36 will pass through the magnetron in such a direction as to reduce or stop the flow of current through the magnetron twice during each revolution of the wheel, once when the magnet is positioned as shown, and once when it is rotated 180° from that position. The voltage pulses appearing on the anode of the magnetron will be positive in that they will be temporary increases in the anode potential caused by decreases in the current flowing from the anode to the cathode of the magnetron.

The pulse output of the magnetron may be shaped and amplified in the manner previously described, before being fed to an electronic counter.

The embodiment of the invention shown in Fig. 3 may be preferred over the form shown in Fig. 1 in those applications where it is desirable to convert the device quickly and easily to provide either one or two output pulses per revolution of the rotating wheel. Both forms of the invention embody the same advantages of being frictionless, sealed against dirt and other contamination, and operable at any reasonable speed.

Fig. 4 illustrates another form of the invention which may be used to count the number of movements made by an element, such as a reciprocating shaft 45. A horseshoe permanent magnet 46 is attached to the shaft 45, and a magnetron 47 is positioned adjacent the shaft and magnet so that, as the shaft reciprocates, the magnetic field of the permanent magnet passes through the magnetron with the lines of force substantially parallel to the axis of the magnetron anode and cathode. The magnetron 47 with its socket 48 may be mounted on one end of a bracket 49, the other end of which is secured to a portion of the frame 50 of the device, which also supports the reciprocating shaft 45 in suitable bearings. The magnetron may be energized from a pulse shaping circuit like that previously described.

As the shaft 45 reciprocates and the magnetic field of magnet 46 passes back and forth through the magnetron, the current flowing through the magnetron will vary in accordance with the principles previously set forth. Thus, each time the magnetic field passes through the magnetron, assuming it to be properly oriented with respect to the magnetron anode and cathode, a positive voltage pulse will appear on the magnetron anode. These pulses may be shaped and amplified before being used to trigger a counter, in the manner previously described.

It is apparent that the magnet may be so mounted lengthwise of the shaft 45 that its magnetic field passes through the magnetron during the excursion of the shaft and again during the return movement. Thus, two output pulses may be obtained for each cycle of movement of the shaft. If desired, the magnet may be so positioned that its magnetic field intersects the magnetron only once; that is, when the shaft has reached the limit of its travel. In this case, of course, only one output pulse would result from each cycle of movement of the shaft.

Although permanent magnets have been illustrated and described, it is apparent that electromagnets might be provided to serve the same purpose as the permanent magnets. However, it has been found that the strength of the field of a permanent magnet is generally sufficient to provide output pulses of the necessary magnitude on the anode of the magnetron, and its use is preferred for convenience.

In some instances, it is possible to dispense with the pulse shaping circuit and pulse amplifier, and operate an electromagnetic counter relay directly from the output of the magnetron. In this instance, the coil of the relay would be connected in the anode circuit of the tube and the current flowing from anode to cathode of the magnetron would also flow through the relay coil. When the magnetic field of the magnet causes a decrease in the flow of current through the tube, the current flowing through the coil of the relay would also decrease and the relay be allowed either to open or close, as appropriate for the particular arrangement employed. This action could be used to actuate an electromagnetic counter of any well-known type.

It is now apparent that the present invention provides a revolution counter of great utility, and one which has many advantages over those previously known. Of course, many changes and modifications may be made by one skilled in the art without departing from the true spirit of the invention, and it is intended to be limited only by the scope of the appended claims.

What is claimed as new and desired to secure by Letters Patent of the United States is:

1. A counting device, comprising an electronic discharge device of the type wherein the flow of current through said device may be varied by a magnetic field applied thereto, means for applying voltage to said electronic discharge device to establish current flow therethrough, at least one magnet attached to a movable element whose movements are to be counted, said movable element being positioned to move said magnet past said electronic discharge device cyclically whereby the magnetic field of said magnet passes through said electronic discharge device periodically as said magnet moves past the same, and means for indicating the flow of current through said electronic discharge device.

2. A counting device, comprising an electronic discharge device having a cathode and a concentric anode, means including connections for applying voltage to said electronic discharge device to establish current flow between said anode and cathode, at least one magnet attached to a movable element whose movements are to be counted, said movable element being positioned to move said magnet past said electronic discharge device cyclically whereby the lines of magnetic force of said magnet pass through said electronic discharge device periodically in a direction substantially parallel to the axis of said anode and cathode as said magnet moves past the same, thereby causing variations in the current flow between said anode and cathode, and means for counting said variations in the flow of current between said anode and cathode.

3. A revolution counter, comprising an electronic discharge device of the type wherein the flow of current through said device may be varied by a magnetic field applied thereto, means for applying voltage to said electronic discharge device to establish current flow therethrough, a magnet attached to a revolvable element whose revolutions are to be counted, said electronic discharge device being positioned to have the magnetic field of said magnet pass through said discharge device as said magnet revolves, and means for counting variations in the flow of current through said electronic discharge device.

4. A revolution counter, comprising an electronic discharge device having a cathode and a concentric anode, means including connections for applying voltage to said electronic discharge device to establish current flow between said anode and cathode, a magnet attached to a revolvable element whose revolutions are to be counted, said electronic discharge device being positioned to have the lines of magnetic force of said magnet pass through said electronic discharge device in a direction substantially parallel to the axis of said anode and cathode as said magnet revolves, thereby causing variations in the current flow between said anode and cathode, and means for counting said variations in the flow of current between said anode and cathode.

5. A revolution counter, comprising a magnetron, means for applying voltage to said magnetron to establish current flow therethrough, a magnet attached to a revolvable element whose revolutions are to be counted, said magnetron being positioned to have the lines of magnetic force of said magnet pass through said magnetron as said magnet revolves and cause variations in the current flowing through said magnetron, and means for counting the variations in the current flowing through said magnetron.

6. A revolution counter, comprising a magnetron having an anode and a cathode, means for applying voltage to said magnetron to establish current flow between said anode and cathode, a magnet attached to a revolvable element whose revolutions are to be counted, said magnetron being positioned to have the lines of magnetic force of said magnet pass through said magnetron in a direction to cause variations in the flow of current between said anode and cathode as said magnet revolves thus causing voltage pulses to appear on said anode, means for shaping said voltage pulses to provide voltage pulses of substantially constant amplitude and width, and means for counting the shaped voltage pulses.

7. A revolution counter, comprising a magnetron having a cathode and a concentric anode, means for applying voltage to said magnetron to establish current flow between said anode and cathode, a magent mounted to be revolved by an element whose revolutions are to be counted, said magnet being positioned for its lines of magnetic force to pass through said magnetron in a direction substantially parallel to the axis of said anode and cathode twice during each revolution of said element, a second magnet removably mounted adjacent said magnetron in position for its lines of force to pass through said magentron in a direction substantially parallel to the axis of said anode and cathode, and means for counting variations in the flow of current between said anode and cathode.

8. A length measuring device, comprising a wheel constructed to be revolved on its axis by movement of a material past said wheel, a magnet secured to said wheel, a magentron, means for applying voltage to said magnetron to establish current flow therethrough, said magnetron being positioned to have the lines of magnetic force of said magnet pass through said magnetron as said magnet revolves and cause variations in the current flowing through said magnetron, and means for counting the variations in the current flowing through said magnetron.

9. A length measuring device, comprising a wheel constructed to be revolved on its axis by movement of a material past said wheel, a magnet secured to said wheel, a magentron having an anode and a cathode, means for applying voltage to said magnetron to establish current flow between said anode and cathode, said magentron being positioned to have the lines of magnetic force of said magnet pass through said magnetron in a direction to cause variations in the flow of current between said anode and cathode and cause voltage pulses to appear on said anode as said magnet revolves, means for shaping said voltage pulses to provide voltage pulses of substantially constant amplitude and width, and means for counting the shaped voltage pulses.

10. A length measuring device, comprising a magnetron having a cathode and a concentric anode, means for applying voltage to said magnetron to establish current flow between said anode and cathode, a wheel constructed to be revolved by movement of a material past said wheel, a magnet mounted to be revolved by said wheel, said magnet being positioned for its lines of magnetic force to pass through said magnetron in a direction substantially parallel to the axis of said anode and cathode twice during each revolution of said wheel, a second magnet removably mounted adjacent said magnetron in position for its lines of magnetic force to pass through said magnetron in a direction substantially parallel to the axis of said anode and cathode, and means for counting variations in the flow of current between said anode and cathode.

References Cited in the file of this patent

UNITED STATES PATENTS

| | | |
|---|---|---|
| 1,807,098 | Bodde | May 26, 1931 |
| 1,947,399 | Umansky | Feb. 13, 1934 |
| 2,437,374 | Burroughs | Mar. 9, 1948 |
| 2,466,251 | Martin | Apr. 5, 1949 |
| 2,626,536 | Greenberg | Jan. 27, 1953 |